(12) United States Patent
Hayakawa (10) Patent No.: US 7,108,415 B2
(45) Date of Patent: Sep. 19, 2006

(54) OPTICAL ELEMENT WITH LIGHT EXTRACTING DOTS AND DISPLAY DEVICE USING SAME

(75) Inventor: Takashi Hayakawa, Tokyo (JP)

(73) Assignee: Miyakawa Corporation, Tokyo (JP)

( * ) Notice: Subject to any disclaimer, the term of this patent is extended or adjusted under 35 U.S.C. 154(b) by 189 days.

(21) Appl. No.: 10/837,670

(22) Filed: May 4, 2004

(65) Prior Publication Data
US 2005/0190575 A1 Sep. 1, 2005

(30) Foreign Application Priority Data
Mar. 1, 2004 (JP) ............... 2004-056639

(51) Int. Cl.
F21V 7/04 (2006.01)
(52) U.S. Cl. ......................... 362/615; 362/19
(58) Field of Classification Search ................ 362/615, 362/600, 609, 623, 625, 606, 607, 608, 610, 362/561, 26, 19, 559, 330
See application file for complete search history.

(56) References Cited
U.S. PATENT DOCUMENTS
6,174,064 B1 * 1/2001 Kalantar et al. ............ 362/255
6,406,159 B1 * 6/2002 Yamamoto ................... 362/627
6,767,105 B1 * 7/2004 Nakahashi et al. ........... 362/27

FOREIGN PATENT DOCUMENTS
| JP | 1-241590 | 9/1989 |
|----|----------|--------|
| JP | 6-265731 | 9/1994 |
| JP | 10-268138 | 10/1998 |

* cited by examiner

Primary Examiner—Ali Alavi
Assistant Examiner—Bao Q. Truong
(74) Attorney, Agent, or Firm—Young & Thompson (57) ABSTRACT

An optical element and a display device incorporating the optical element are provided. The optical element comprises a panel member having a first surface and a second surface opposite to the first surface, and a jetted pattern of light extracting dots applied to the first surface. Each light extracting dot has a part-spherical surface intersecting the first surface and a transition between the part-spherical surface and the first surface. The transition includes substantially continuous angular configuration from the part-spherical surface angular orientation to the first surface angular orientation.

13 Claims, 7 Drawing Sheets

OPTICAL ELEMENT WITH LIGHT EXTRACTING DOTS AND DISPLAY DEVICE USING SAME

BACKGROUND OF THE INVENTION

The present invention relates generally to optical elements, and liquid crystal display (LCD) devices using same.

LCD devices are widely used in personal communications equipment including, for example, mobile phone, personal computer and electric home appliance. In order to light a LCD, a back lighting and a front lighting are known. The back lighting surpasses the front lighting in providing good outward appearance at the display. A need remains for advanced technology toward enhanced brightness of back lighting. In order to enhance the brightness, there are several proposals. First, it is proposed to use light sources of increased brightness. Second, it is proposed to use optical films or the like. Third, it is proposed to use a light guide of increased brightness. Some of these proposals are as follows:

JP02-241590A discloses a light emitting panel assembly including a light guide. The light guide has a first surface, a second surface opposite to the first surface and a print pattern of white shapes formed on the first surface. The white shapes may be varied in the percentage and/or size in different areas of the light guide in order to provide a uniform light output distribution. Ordinarily, the amount of light traveling through the light guide is greater in areas closer to a light source than in other areas further remote from the light source. The pattern is used to adjust for the light variance by providing a denser concentration of white shapes with increased distance from the light source thereby resulting in a more uniform light output distribution from the light guide.

JP06-265731A discloses a light emitting panel assembly including a light guide. The light guide has a first surface, a second surface opposite to the first surface and a pattern of shallow circular depressions. The shallow circular depressions may be varied in diameter and/or depth in different areas of the light guide. The pattern is used to adjust for the variance of amount of light traveling through the light guide in different areas by providing a greater volume of shallow circular depressions with increased distance from a light source thereby resulting in a more uniform light output distribution from the light guide.

JP10-268138A discloses a light emitting panel assembly including a light guide. The light guide has a first surface and a second surface opposite to the first surface. A film including an array of prisms is attached to the first surface and another array of prisms is formed in the second surface.

Light extracting deformities, for example, dots, prisms, part-spheres, columns, square pillars, cones, or pyramids are produced by providing a molded pattern on the back surfaces of the light guides. Providing the molded pattern will require a permanent modification of a metal mold during adjustment for reducing or eliminating light output non-uniformity. Thus, the molded pattern cannot reinstate the previous pattern. For example, dots may be patterned onto a metal mold directly or they may be patterned onto a metal mold by etching.

Figure 10:
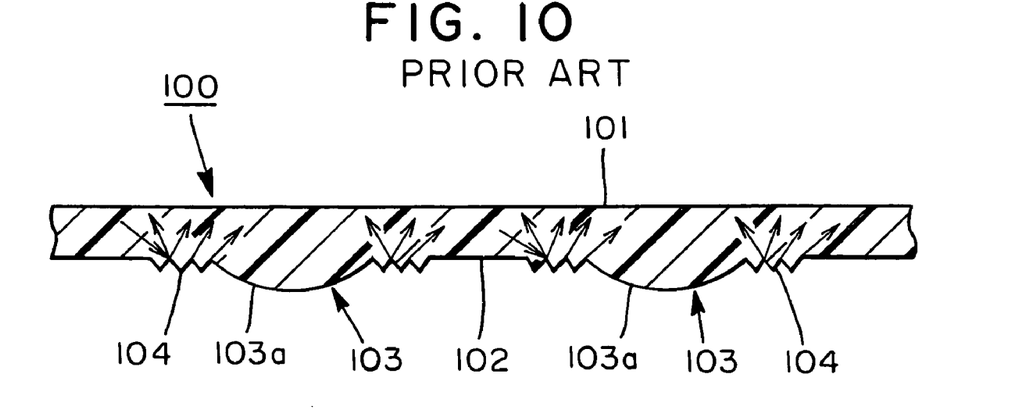
FIGS. 10 to 12 are schematic sectional illustrations of optical elements in accordance with prior art.

FIG. 10 is an illustration of dots 103 produced by providing a molded pattern, using a metal mold with dots patterned directly, on a back surface 102 opposite to a light output surface 101 of an optical element in the form of a light guide 100. Each dot 103 has a spherical shaped lens surface 103a intersecting the back surface 102 and a transition 104 between the spherical shaped lens surface 103a and the back surface 102. Due to warp during fabrication of the metal mold, the transition 104 inevitably includes discontinuous and irregular angular configuration from the spherical shaped lens surface angular orientation to the back surface angular orientation. As indicated by arrows in FIG. 10, the transition 104 scatters a portion of light rays impinging on the transition 104 from a desired viewing axis and therefore reduces on-axis brightness.

Figure 11:
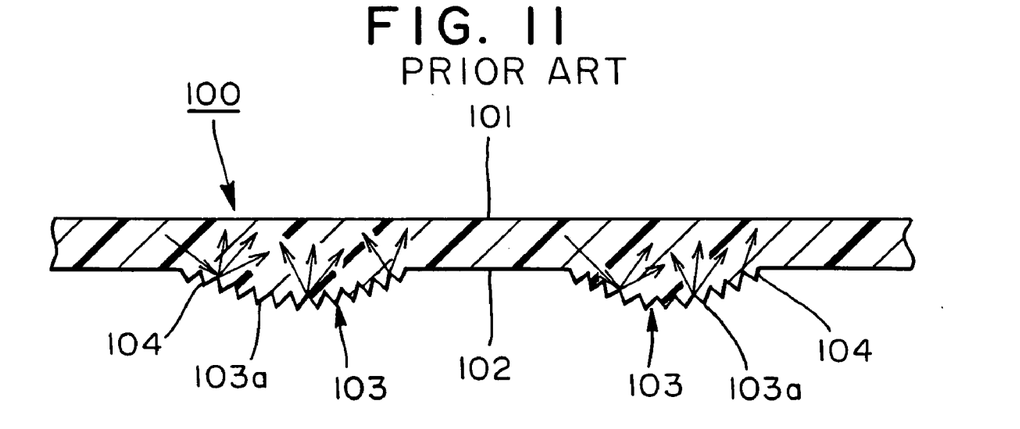

FIG. 11 is an illustration of dots 103 produced by providing a molded pattern, using a metal mold with dots patterned by etching, on a back surface 102 opposite to a light output surface 101 of an optical element in the form of a light guide 100. Each dot 103 has a spherical shaped lens surface intersecting the back surface 102 and a transition 104 between the spherical shaped lens surface 103a and the back surface 102. As etching cannot produce the surface of metal mold to a desired level of smoothness, the spherical shaped lens surface 103a and the transition 104 inevitably have discontinuous and irregular angular configuration entirely. As indicated by arrows in FIG. 11, the spherical shaped lens surface 103a and transition 104 scatter light rays impinging on the spherical shaped lens surface 103a and transition 104 from a desired viewing axis and therefore reduce on-axis brightness.

Figure 12:
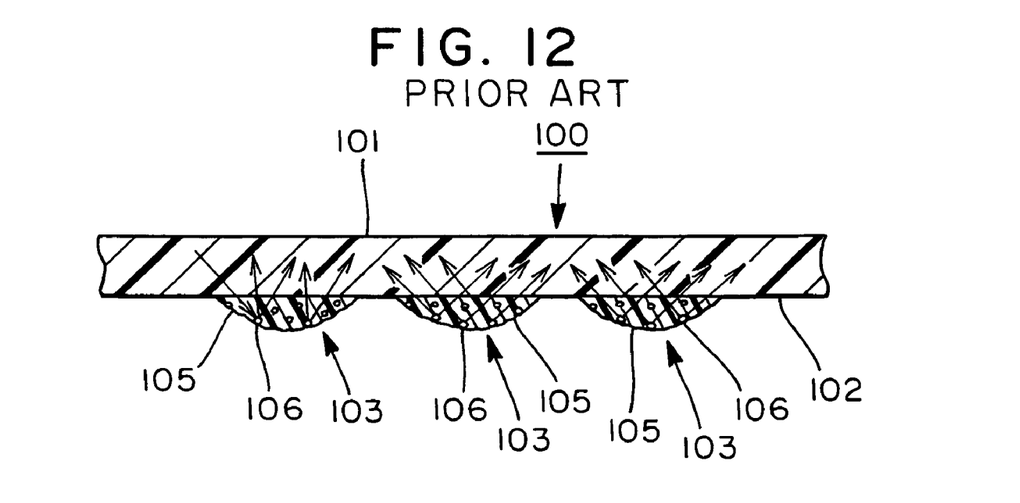

FIG. 12 is an illustration of dots 103 produced by providing an inked pattern, using a screen printing, on a back surface 102 opposite to a light output surface 101 of an optical element in the form of a light guide 100. Ink 105 for screen printing contains beads 106. As indicated by arrows in FIG. 12, the beads 106 scatter input light rays from a desired viewing axis and therefore reduce on-axis brightness.

Attempts to increase on-axis brightness by efficient utilization of light include molded and/or printed patterns of dots. However, these attempts have not proven entirely satisfactory.

SUMMARY OF THE INVENT

In accordance with one aspect of the present invention, a display device comprises: a display panel; a light source; and an optical element optically disposed between the light source and the display panel. The optical element includes a panel member having a first surface and a second surface opposite to the first surface, and a plurality of light extracting dots applied to the first surface. Each light extracting dot has a curved surface intersecting the first surface and a transition between the curved surface and the first surface. The transition includes substantially continuous angular configuration from the curved surface angular orientation to the first surface angular orientation.

In accordance with another aspect of the present invention, an optical element comprises: a panel member having a first surface and a second surface opposite to the first surface; and a plurality of light extracting dots applied to the first surface. Each light extracting dot has a curved surface intersecting the first surface and a transition between the curved surface and the first surface. The transition includes substantially continuous angular configuration from the curved surface angular orientation to the first surface angular orientation.

In accordance with another aspect of the present invention, An optical element comprising:

a panel member having a first surface and a second surface opposite to the first surface; and a jetted pattern of light extracting dots applied to the first surface, each light extracting dot having a part-spherical shaped surface intersecting the first surface and a transition between the part-spherical shaped surface and the first surface, the transition including substantially continuous angular configuration from the part-spherical shaped surface angular orientation to the first surface angular orientation.

DETAILED DESCRIPTION OF THE PREFERRED EMBODIMENTS

Figure 1:
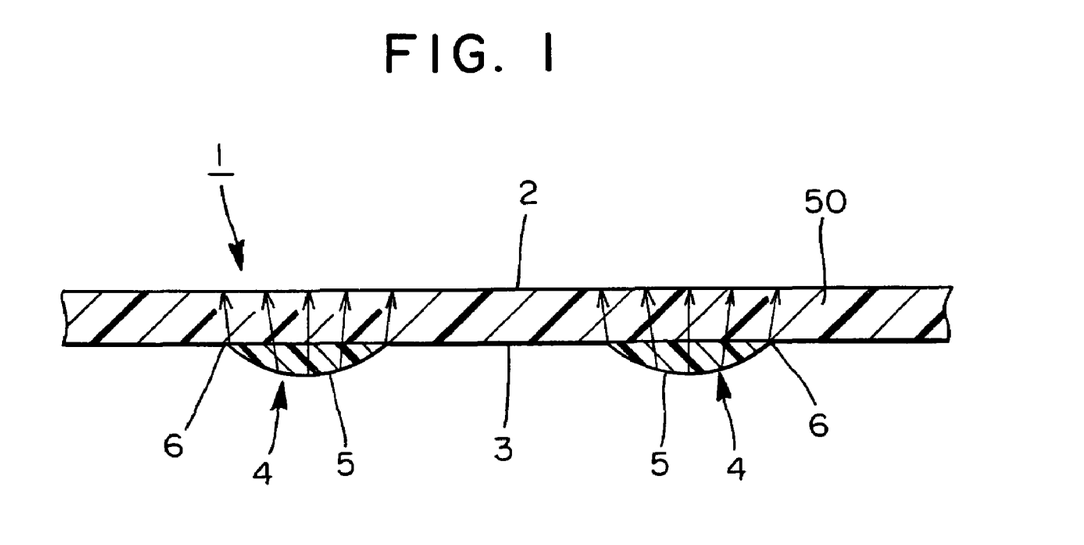
FIG. 1 is a schematic sectional illustration of an optical element constructed in accordance with one preferred embodiment of the present invention.

Referring now in detail to the drawings, and initially to FIG. 1, there is schematically shown one form of optical element 1 in accordance with the present invention. To fit an application of providing a light guide in a LCD device, the optical element 1 is optically disposed between a light source and a display panel in the form of a LCD. The optical element 1 comprises a panel member in the form of a light guide 50 having a first or back surface 3 and a second or light output surface 2 opposite to the first surface 3. The "panel member" is herein used to mean a light emitting panel member, a light guide, a polarizing film, an optical sheet or the like. The optical element 1 also comprises a plurality of light extracting dots 4 applied to the first surface 3. Each light extracting dot 4 has a curved surface 5 intersecting the first surface 3 and a transition 6 between the curved surface and the first surface 3. The transition 6 includes substantially continuous angular configuration from the curved surface angular orientation to the first surface angular orientation. In plain words, the transition 6 is free from any disarray in surface angular orientation.

The light extracting dots 4 are produced by providing a jetted pattern. The term "jetted pattern" is herein used to mean a pattern applied by jet. The light extracting dots 4 may vary in size and/or shape by varying the jet in nozzle height, jet in pressure, jet in quantity, jet in number, or jet in viscosity of material. The light extracting dots 4 may be used to control the percent of light emitted from any areas of the panel member 50. For example, less and/or smaller size light extracting dots 4 may be placed on areas where less light output is wanted. Conversely, a greater percentage of and/or larger light extracting dots 4 may be placed on areas of the panel member 50 where greater light output is desired.

Varying the percentage and/or size of light extracting dots in different areas of the panel member is necessary in order to provide a uniform light output distribution. For example, the amount of light traveling through the panel member will ordinarily be greater in areas closer to the light source than in other areas further remote from the light source. A pattern of light extracting dots 4 may be used to adjust for the light variances within the panel member 50, for example, by providing a denser concentration of light extracting dots with increased distance from a light source thereby resulting in a more uniform light output distribution from the panel member 50. The concentration of light extracting dots 50 may vary by varying a pitch in feed direction of an X-Y table or varying a pitch between jet nozzles in order to vary a pitch between light extracting dots 4 within the X-Y coordinate system.

By varying the instructions on pitch in feed direction and/or a pitch between jet nozzles, the jetted pattern of light extracting dots 4 can be controlled and any desired one of jetted patterns of light extracting dots 4 can be realized quickly.

Jetted patterns of light extracting dots 4 may vary in shapes such as spherical dots, elliptical dots, triangular dots, polygonal dots. Jetted patterns may be sufficiently small in area per dot and fine in lines per unit width so as to make the dots 4 in the jetted patterns nearly invisible to the human eyes in a particular application thereby eliminating the detection of gradient or banding lines that are common to light extracting patterns utilizing larger dots. Additionally, the dots 4 may vary in shape and/or size along the length and/or width of the panel members. Also, a random placement pattern of the dots may be utilized throughout the length and/or width of the panel members. Moreover, the dots may be colored in order to effect color correction in the panel members. The color of the dots may also vary throughout the panel members, for example to provide different colors for the same or different light output areas.

A drop of material applied to the light guide 50 by a single jet forms a dot having a part-spherical raised surface. The dot may vary in size by repeating the jet to apply drops of material to the same location on the light guide 50. The size of dot may vary also by varying the jet in nozzle height, jet in pressure, or jet in viscosity of material. The size of dot may vary with the wettability of light guide 50.

The dot may vary in shapes such as a part-spherical dot, elliptical dot, triangular dot, or polygonal dot by repeating jet to apply drops of material to the adjacent location or locations.

A transparent light emitting material of any type including, for example, acrylic or polycarbonate resin, may be used for the light guide 50. A transparent adhesive material of basically resin type may be used for the light extracting dots 4.

The tight bond between the dots 4 and light guide 50 is required over the entirety of its product life thereby eliminating the detection of pin holes that are common to light extracting patterns utilizing the light guides with some of the light extracting dots disengaged.

The part-spherical raised surface of the dots 4 may vary with the surface tension of resin used as the material thereby making it important to select an appropriate resin to fit an application and to control the viscosity of the selected resin.

The dots 4 may be colored by selecting an appropriate resin as its material to fit a color required. Selecting the appropriate resin should account for the efficiency of reflection by the dots.

The dots 4 may be used to control the output ray angle distribution of the emitted light to suit a particular application of providing a LCD back light. In this case, the light output will be more efficient if the dots 4 cause the light rays to emit from the light guide 50 at predetermined ray angles such that they will pass through the LCD with low loss. Light rays exiting the light guide 50 out of the first surface 3 encounter the dots 4. The light rays are refracted and reflected by the dots 4 such that they are directed to emit from the light guide 50 at the predetermined ray angles. Varying the material of dots 4 may vary an index of refraction thereby varying brightness of the light output. Accordingly, resins that have an index of refraction to provide more brightness of the light output are desirably employed for the dots 4. Examples of such resins are acrylic resin and polycarbonate resin.

The dots 4 may vary in diameter with wettability of the panel members 50 such as light guides or polarizing films. For example, smaller diameter dots 4 may be placed on the panel members 50 with lower wettability. Conversely, larger diameter dots 4 may be placed on the panel members 50 with higher wettability. Varying the dots 4 in diameter causes light output inflected by the dots 4 to vary. Accordingly, materials that have wettability to cause the dots 4 to provide more efficient inflection are desirably employed for the panel members 50 such as light guides or polarizing films.

If, for example, ultraviolet (UV) is used for curing the resin employed for the dots 4 after being applied to the panel member 50, the part-spherical raised surface of dots 4 may vary in shape with the amount and/or wavelength of UV rays. As contact angle with the part-spherical surface of the dots 4 causes the efficiency of inflection to vary, the UV curing is desirably carried out under appropriate conditions.

Figure 2:
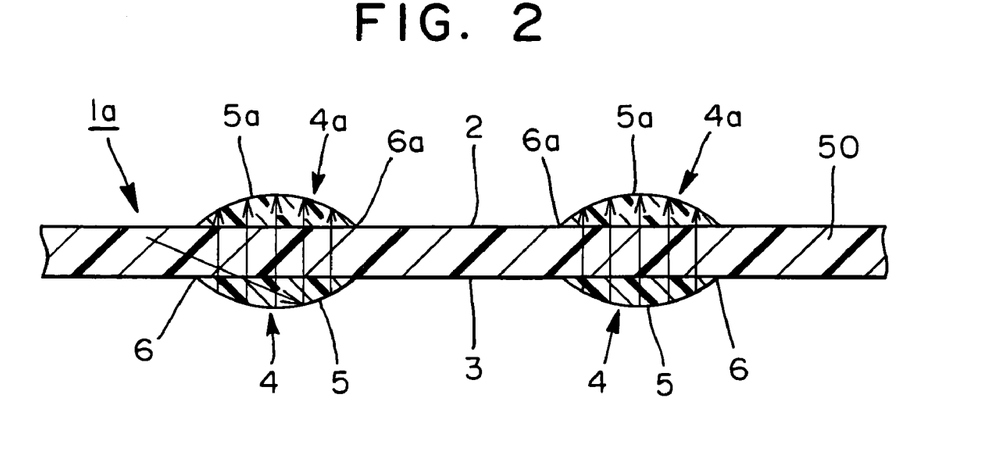
FIG. 2 is a schematic sectional illustration of an optical element constructed in accordance with another preferred embodiment of the present invention.

Referring now to FIG. 2, there is schematically shown another form of optical element 1a in accordance with the present invention. The optical element 1a is substantially the same as the optical element 1 shown in FIG. 1 in that a jetted pattern of first light extracting dots 4 are applied to a first surface 3 of a panel member in the form of a light guide 50. However, the optical element 1a is different from the optical element 1 in that it also includes a jetted pattern of second light extracting dots 4a applied to a second or light output surface 2 of the light guide 50. Each second light extracting dot 4a has a second curved surface 5a intersecting the second surface 2 and a transition 6a between the second curved surface 5a and the second surface 2. The second curved surface 5a may be in the form of a part-spherical raised surface. The transition 6a of each of the plurality of second light extracting dots 4a includes substantially continuous angular configuration from the second curved surface angular orientation to the second surface angular orientation.

Figure 4:
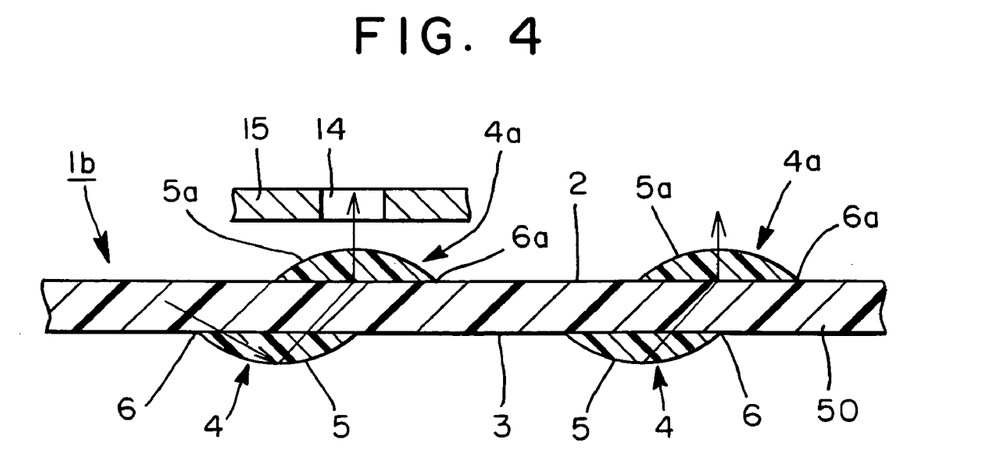
FIG. 4 is a schematic sectional illustration of an optical element constructed in accordance with another preferred embodiment of the present invention.

Referring also to FIG. 4 with continuing reference to FIG. 2, each of the second light extracting dots 4a is positioned to receive light rays directed by one of the first light extracting dots 4 as is readily understood from arrows schematically illustrate light rays directed by the first light extracting dots 4.

In the form of optical element 1a shown in FIG. 2, the light rays directed by the first light extracting dots 4 enter the panel member in the form of light guide 50 inwardly from the back surface 3 toward the light output surface 2 in a direction normal to the light output surface. The second light extracting dots 4a are arranged in alignment with the first light extracting dots 4 with respect to the direction normal to the light output surface 2, respectively.

FIG. 4 shows another form of optical element 1b, which is substantially the same as the optical element 1a shown in FIG. 2 except the positional relationship between the first and second light extracting dots 4 and 4a. In the positional relationship shown in FIG. 2, the second light extracting dots 4a are arranged in alignment with the first light extracting dots 4 with respect to the direction normal to the light output surface 2, respectively. As different from the relationship shown in FIG. 2, the second light extracting dots 4a are arranged out of alignment with the plurality of first mentioned light extracting dots with respect to the direction normal to the second surface, respectively.

Figure 3:
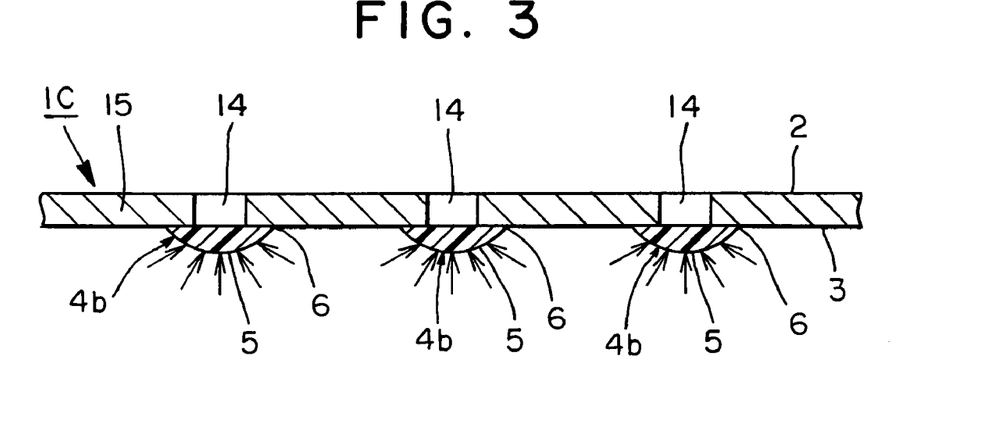
FIG. 3 is a schematic sectional illustration of an optical element constructed in accordance with another preferred embodiment of the present invention.

Referring to FIG. 3, there is schematically shown another form of optical element 1c in accordance with the present invention. The optical element 1c is substantially the same as the optical element 1 shown in FIG. 1 in that a jetted pattern of light extracting dots 4b are applied to a first surface 3 of a panel member 15. However, the optical element 1c is different from the optical element 1 in that the panel member is in the form of a polarizing film 15 formed with a plurality of openings 14 and the light extracting dots 4b cover the openings 14, respectively. Each of the light extracting dots 4b has a curved surface 5 intersecting the first surface 2 and a transition 6 between the curved surface 5 and the second surface 2. The curved surface 5 is in the form of a part-spherical raised surface to direct light rays (see arrows) impinging on it into the associated one of openings 14. The transition 6 of each of the plurality of light extracting dots 4b includes substantially continuous angular configuration from the curved surface angular orientation to the first surface angular orientation.

Figure 5:
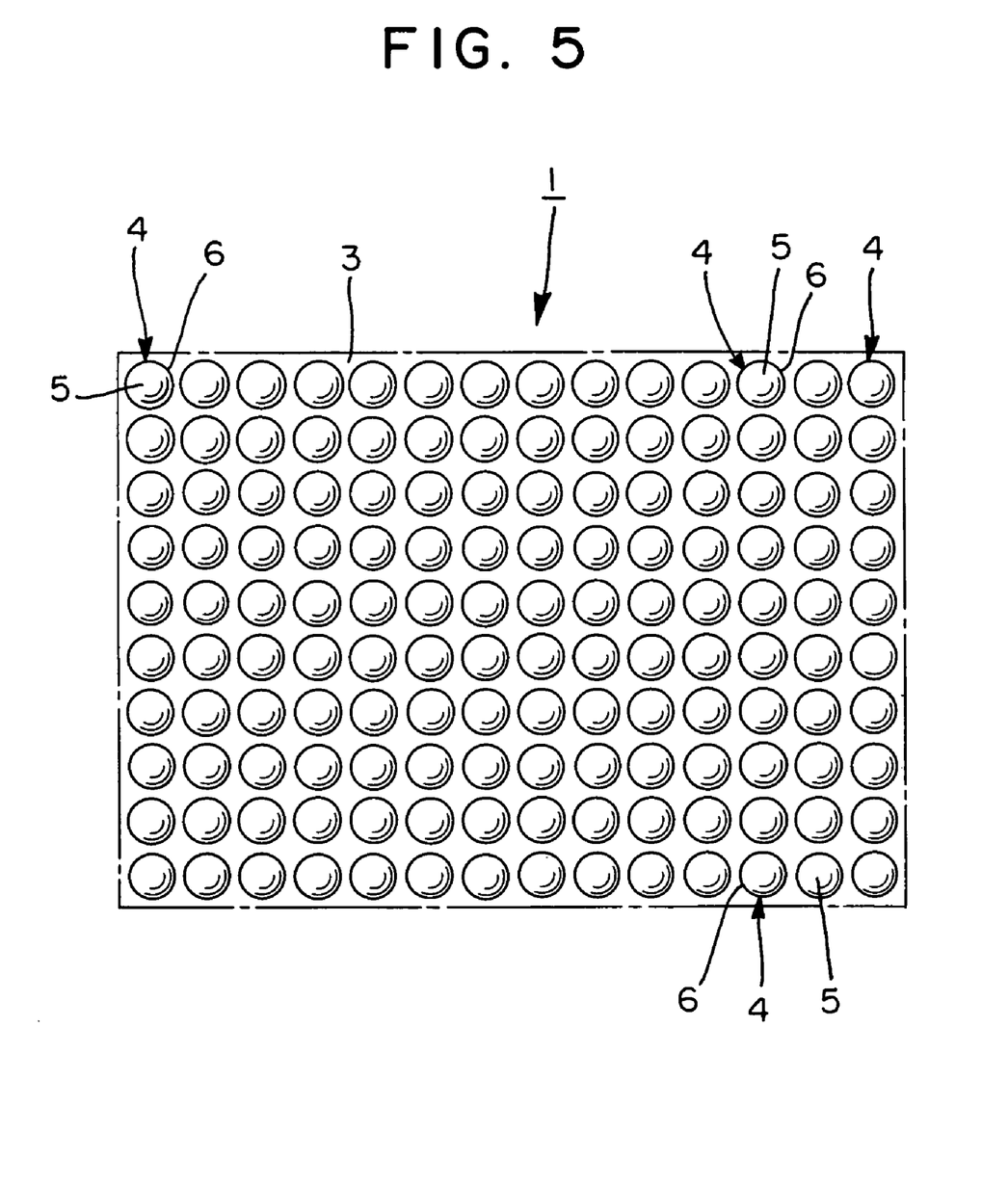
FIG. 5 is an enlarged schematic plan view of a portion of the optical element shown in FIG. 1.

Referring to FIG. 5, there is schematically shown one example of jetted pattern of light extracting dots 4 (or 4b). In this example, the jetted pattern of light extracting dots 4 provides an array of lenses.

Figure 6:
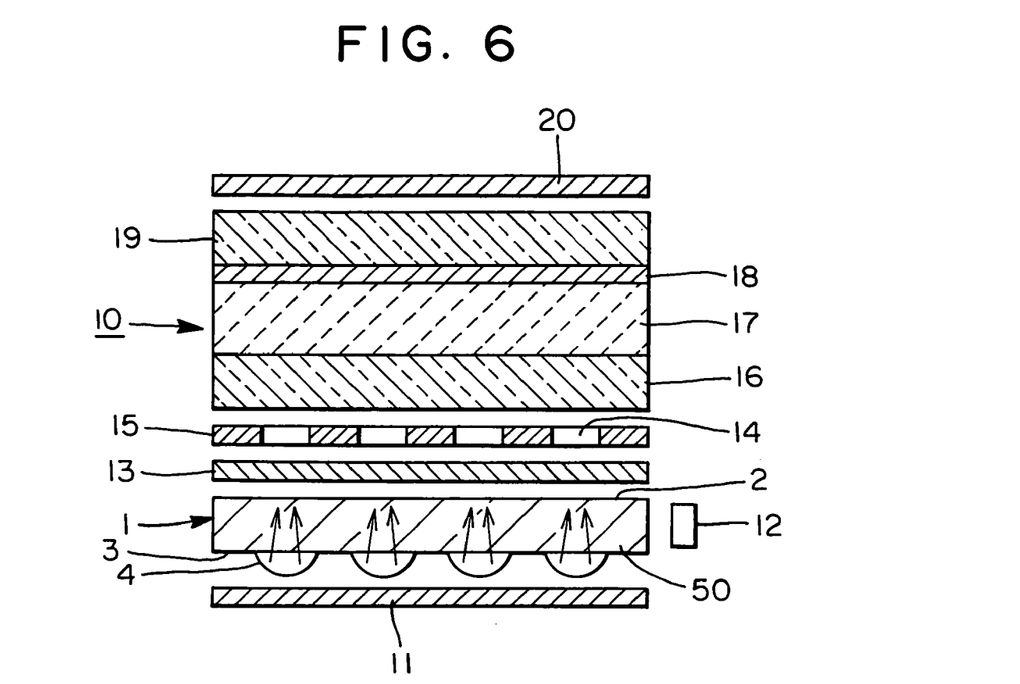
FIG. 6 is a schematic sectional illustration of an LCD device adapted in accordance with the embodiment shown in FIG. 1.

Referring to FIG. 6, there is schematically shown one form of a liquid crystal display (LCD) device 10 in which an optical element 1 (see FIG. 1) is optically disposed in a known manner between a light source 12 in the form of light emission diodes (LEDs) and a display including liquid crystal 17 and a color filter 18, which are interposed between glass panels 16 and 19. The LCD device 10 includes a reflector 11 positioned against a first surface 3 of a light guide 50, and an optical sheet 13 positioned against a second surface 2 of the light guide 50. The LCD device 10 further includes a polarized film 15 between the optical sheet 13 and the glass panel 16, and another polarized film 20 on the other glass panel 19. The polarized film 15 is formed with a plurality of openings 14.

Figure 7:
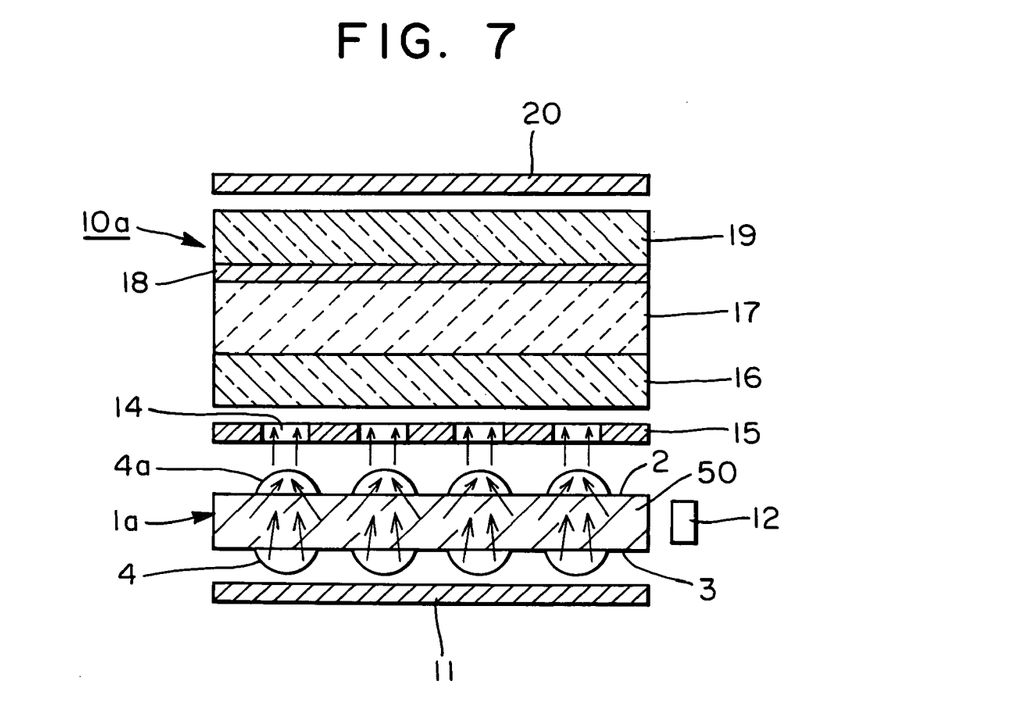
FIG. 7 is a schematic sectional illustration of an LCD device adapted in accordance with the embodiment shown in FIG. 2.

Referring to FIG. 7, there is schematically shown another form of a liquid crystal display (LCD) device 10a in which an optical element 1a (see FIG. 2) is optically disposed in a known manner between a light source 12 in the form of light emission diodes (LEDs) and a display including liquid crystal 17 and a color filter 18, which are interposed between glass panels 16 and 19. The LCD device 10 includes a reflector 11 positioned against a first surface 3 of a light guide 50. The LCD device 10 further includes a polarized film 15 positioned against a second surface 2 of the light guide 50, and another polarized film 20 on the other glass panel 19. The polarized film 15 is formed with a plurality of openings 14 in alignment with second light extracting dots 4a, respectively, to allow passage of the light rays from the second light extracting dots 4a to the glass panel 16. It is appreciated that the provision of second light extracting dots 4a has eliminated the use of an optical sheet 13 used in FIG. 6.

Figure 8:
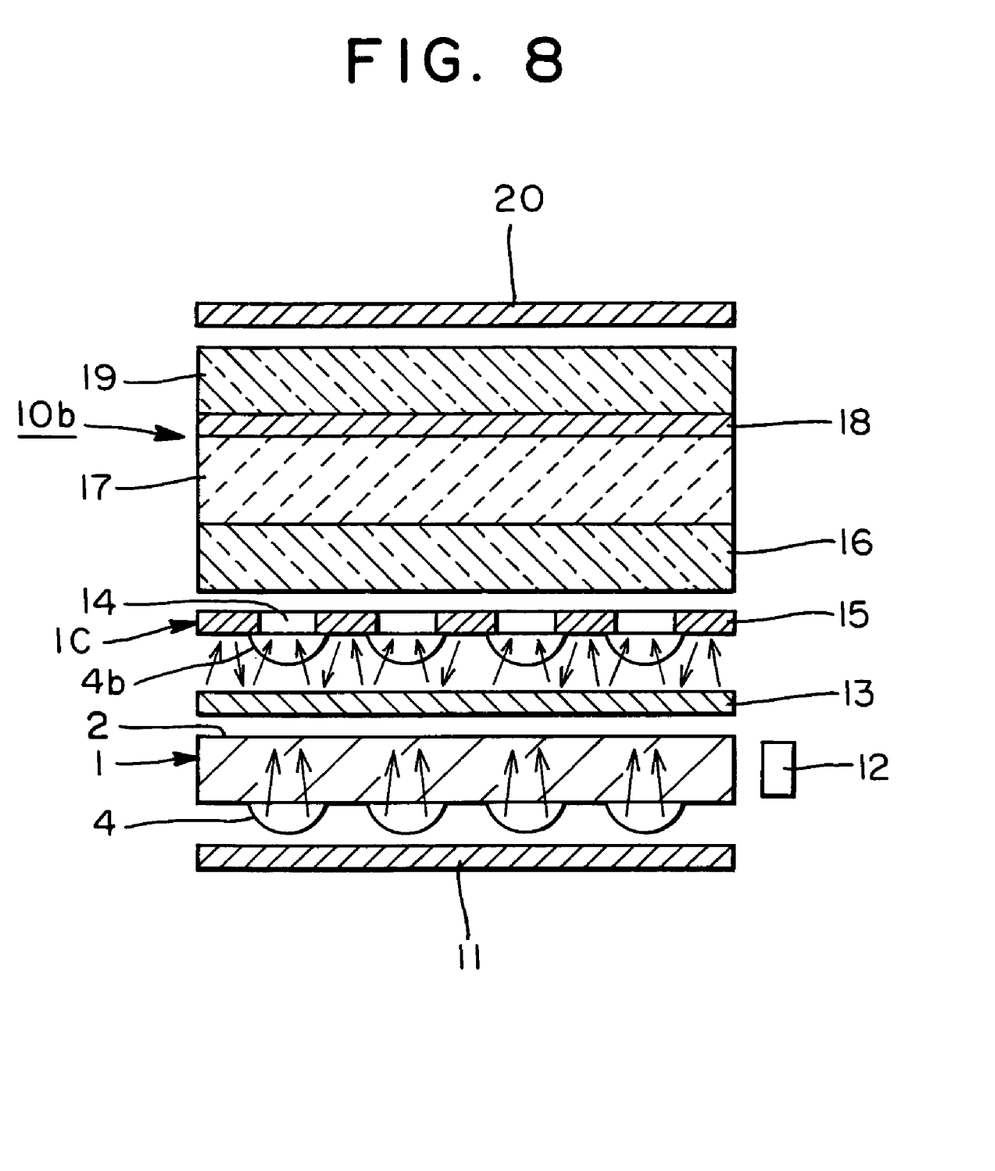
FIG. 8 is a schematic sectional illustration of an LCD device adapted in accordance with the embodiments shown in FIGS. 1 and 3.

Referring to FIG. 8, there is schematically shown another form of a liquid crystal display (LCD) device 10b in which an optical element 1 (see FIG. 1) and an optical element 1c (see FIG. 3) are optically disposed in a known manner between a light source 12 in the form of light emission diodes (LEDs) and a display including liquid crystal 17 and a color filter 18, which are interposed between glass panels 16 and 19. The LCD device 10b includes a reflector 11 positioned against a first surface 3 of a light guide 50, and an optical sheet 13 positioned against a second surface 2 of the light guide 50. The optical sheet 1c, including a polarized film 15, is disposed between the optical sheet 13 and the glass panel 16, and another polarized film 20 on the other glass panel 19.

Figure 9:
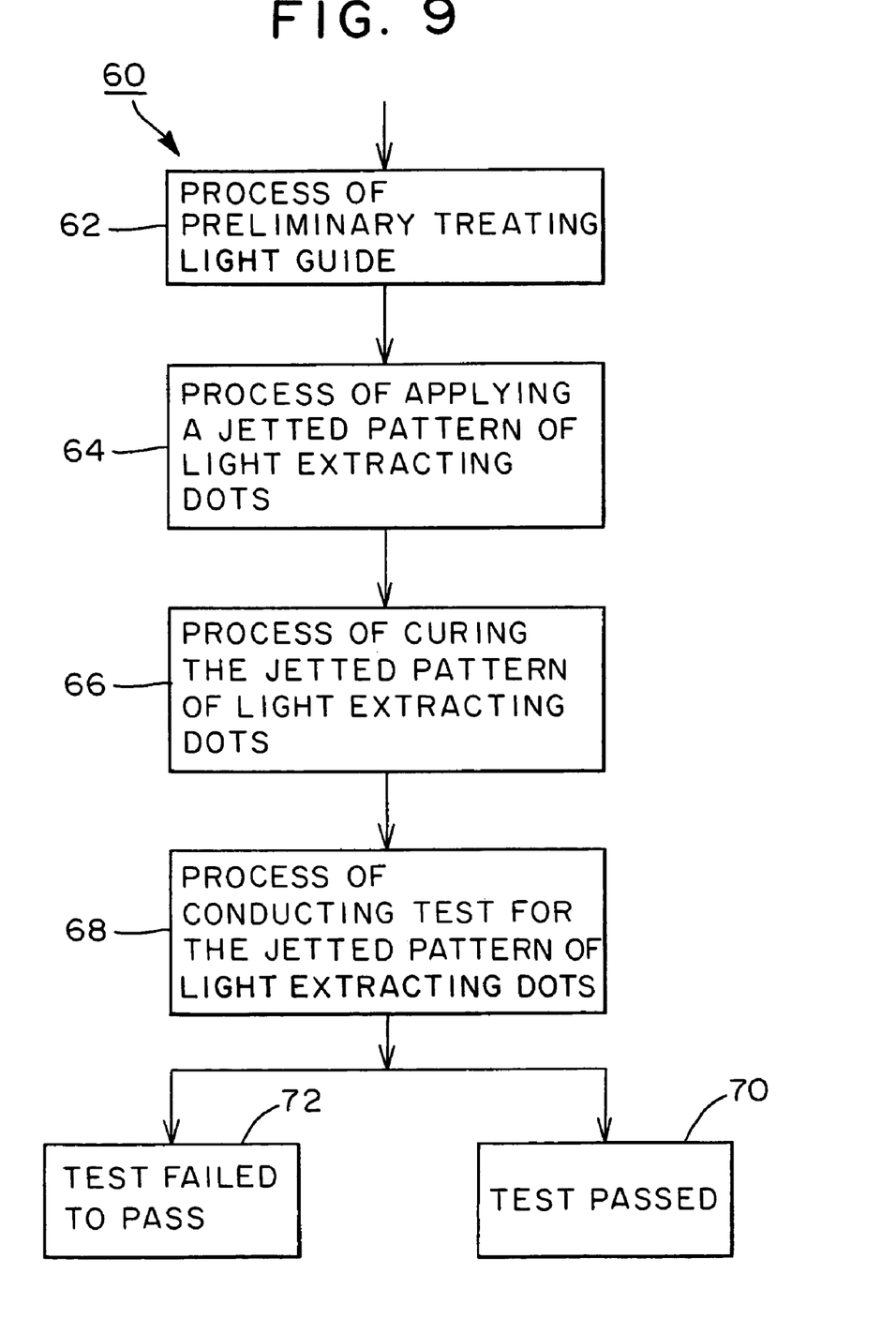
FIG. 9 is a block diagram illustrating a method for fabrication of the optical element shown in FIG. 1.

In FIG. 9, a block diagram illustrates a method for fabrication of an optical element shown in FIG. 1, generally indicated at 60.

At block 62, a process of preliminary treating a light guide begins with cleaning its surfaces by air blow. Subsequently, the surfaces are controlled, in wettability, by surface treatments including thermal treatment within a bath at temperatures below 60 degrees centigrade.

At next block 64, a process of applying a jetted pattern of light extracting dots begins with placing the light guide on an X-Y table with its first or back surface (3) up. The light guide may be fixed to the X-Y table using vacuum or adhesive tape. Subsequently, any one of four corners of the light guide is corrected into agreement with the origin by image recognition using a CCD camera or mechanically. A jetted pattern of light extracting dots are applied to a pattern area on the first or back surface (3) using ink jet.

Conditions:

(a) With regard to adjustment for variances of resin in viscosity, dots with less in diameter and greater in height are placed on the pattern area if the resin with greater in viscosity is applied using ink jet because the greater viscosity causes more influence by surface tension. Accordingly, the dots may vary with adjustment for variances of viscosity of resin used by ink jet. Of course, the viscosity of resin is desirably kept constant over operation of ink jet for applying a jetted pattern of light extracting dots.

(b) With regard to adjustment for variances of nozzle position of ink jet, the nozzle is desirably positioned in height less than or equal to 54.47 microns to keep the accuracy of an X-Y coordinate system less than or equal to 1 micron because the accuracy of angular orientation of jet is ? 1 degree. If it is desired to keep the accuracy of the X-Y coordinate system less than or equal to 5 microns, the nozzle is positioned in height less than or equal to 287.5 microns. This may be calculated using the relationship that: tan 1°=0.0174. The dots with less in diameter and greater in height are placed on the pattern area using ink jet with higher in nozzle height. Accordingly, the dots may vary with adjustment for variances of nozzle height. Of course, the nozzle height is desirably kept constant over operation of ink jet for applying a jetted pattern of light extracting dots.

(c) With regard to pressure at which resin is applied by ink jet, dots with greater in diameter and lower in height are placed on the pattern area if resin is applied by ink jet at higher pressure. Accordingly, the dots may vary with adjustment for variances of pressure. Of course, the pressure is desirably kept constant over operation of ink jet for applying a jetted pattern of light extracting dots. The amount of resin per one injection by ink jet is desirably kept constant.

d) With regard to adjustment for variances of drop in number by ink jet, dots may vary in diameter, height and volume if an ink jet used can perform multiple injections against one location. Accordingly, the dots may vary in shape with variances of the number of injections by ink jet against one location.

e) With regard to data input of pitch and dot, high accuracy in pitch in feeding the X-Y coordinate table is required as well as high accuracy in pitch between ink jet nozzles. Dots may vary in size to adjust for the light variances within the light guide, for example, by providing larger light extracting dots with increased distance from a light source thereby resulting in a more uniform light output distribution from the light guide. The desired variances in size of light extracting dots may be realized by varying a pitch in feed direction of the X-Y table and/or varying a pitch between jet nozzles in order to vary a pitch between light extracting dots within the X-Y coordinate system. By varying the instructions on pitch in feed direction and/or pitch between jet nozzles, the jetted pattern of light extracting dots can be controlled and any desired one of jetted patterns of light extracting dots can be realized quickly.

With continuing reference to FIG. 9, at block 66, a process of curing the jetted pattern of light extracting dots may be carried out using UV rays or infrared rays. If, for example, ultraviolet (UV) is used for curing the resin employed for the dots after being applied to the pattern area on the light guide, the part-spherical raised surface of dots may vary in shape with the amount, wavelength and radiation time of UV rays. As contact angle with the part-spherical surface of the dots causes the efficiency of inflection to vary, the UV curing is desirably carried out under appropriate conditions.

At the next block 68, a process of conducting test for the jetted pattern of light extracting dots may be carried out by comparing the diameter D of dots to criteria D ? d. If test is passed, no alarm is produced at block 70. If test fails to pass, an alarm is produced at block 72. The height of dots may be compared to established criteria also.

From the preceding description, it will be appreciated as advantage of the present invention that the transition including substantially continuous angular configuration from the curved surface angular orientation to the first surface angular orientation can direct substantially all of light impinging on the dots in desired distribution of direction.

Although the present invention has been shown and described with respect to certain preferred embodiments, it is obvious that equivalent alterations and modifications will occur to those skilled in the art upon the reading and understanding of the specification. The present invention includes all such equivalent alterations and modifications, and is limited only by the scope of the claims.

What is claimed is:

1. A display device comprising:
    a display panel;
    a light source; and
    an optical element optically disposed between the light source and the display panel,
    the optical element including a panel member having a first surface and a second surface opposite to the first surface, and a plurality of light extracting dots applied to the first surface, each light extracting dot having a curved surface intersecting the first surface and a transition between the curved surface and the first surface, the transition including substantially continuous angular configuration from the curved surface angular orientation to the first surface angular orientation, wherein the panel member is a polarizing film.

2. The display device as claimed in claim 1, wherein the optical element also includes a plurality of second light extracting dots applied to the second surface, each having a second curved surface intersecting the second surface and a transition between the second curved surface and the second surface, the transition of each of the plurality of second light extracting dots including substantially continuous angular configuration from the second curved surface angular orientation to the second surface angular orientation.

3. The display device as claimed in claim 2, wherein each of the plurality of second light extracting dots is positioned to receive light rays directed by one of the plurality of first mentioned light extracting dots.

4. The display device as claimed in claim 3, wherein the light rays directed by the first mentioned light extracting dot enter the optical element inwardly from the first surface toward the second surface in a direction normal to the second surface, and wherein the plurality of second light extracting dots are arranged in alignment with the plurality of first mentioned light extracting dots with respect to the direction normal to the second surface, respectively.

5. The display device as claimed in claim 3, wherein the light rays directed by the first mentioned light extracting dot enter the optical element inwardly from the first surface toward the second surface in a direction normal to the second surface, and wherein the plurality of second light extracting dots are arranged out of alignment with the plurality of first mentioned light extracting dots with respect to the direction normal to the second surface, respectively.

6. The display device as claimed in claim 1, wherein the polarizing film is formed with a plurality of openings within the first surface, and wherein the plurality of light extracting dots cover the plurality of openings, respectively.

7. A display device comprising:
a display panel;
a light source; and
an optical element optically disposed between the light source and the display panel,
the optical element including a panel member having a first surface and a second surface opposite to the first surface, and a plurality of light extracting dots applied to the first surface, each light extracting dot having a curved surface intersecting the first surface and a transition between the curved surface and the first surface,
the transition including substantially continuous angular configuration from the curved surface angular orientation to the first surface angular orientation,
wherein the panel member is a light guide, and
wherein the optical element also includes a plurality of second light extracting dots applied to the second surface, each having a second curved surface intersecting the second surface and a transition between the second curved surface and the second surface,
the transition of each of the plurality of second light extracting dots including substantially continuous angular configuration from the second curved surface angular orientation to the second surface angular orientation.

8. The display device as claimed in claim 7, wherein each of the plurality of second light extracting dots is positioned to receive light rays directed by one of the plurality of first mentioned light extracting dots.

9. The display device as claimed in claim 8, wherein the light rays directed by the first mentioned light extracting dot enter the panel member inwardly from the first surface toward the second surface in a direction normal to the second surface, and wherein the plurality of second light extracting dots are arranged in alignment with the plurality of first mentioned light extracting dots with respect to the direction normal to the second surface, respectively.

10. The display device as claimed in claim 8, wherein the light rays directed by the first mentioned light extracting dot enter the panel member inwardly from the first surface toward the second surface in a direction angled with respect to a direction normal to the second surface, and wherein the plurality of second light extracting dots are arranged out of alignment with the plurality of first mentioned light extracting dots with respect to the direction normal to the second surface, respectively.

11. The display device as claimed in claim 8, further comprising a reflector positioned against the first surface of the light guide; and a polarizing sheet positioned against the second surface formed with the plurality of second light extracting dots.

12. A display device comprising:
a display panel;
a light source; and
an optical element optically disposed between the light source and the display panel,
the optical element including a panel member having a first surface and a second surface opposite to the first surface, and a plurality of light extracting dots applied to the first surface, each light extracting dot having a curved surface intersecting the first surface and a transition between the curved surface and the first surface,
the transition including substantially continuous angular configuration from the curved surface angular orientation to the first surface angular orientation,
wherein the panel member is a light guide,
further comprising a reflector positioned against the first surface of the light guide, and an optical sheet positioned against the second surface,
further comprising a polarizing film having a surface positioned against the optical sheet on the remote side thereof from the light guide;
wherein the polarizing film includes a plurality of second light extracting dots applied to the second surface, each having a second curved surface intersecting the second surface and a transition between the second curved surface and the second surface,
the transition of each of the plurality of second light extracting dots including substantially continuous angular configuration from the second curved surface angular orientation to the second surface angular orientation;
wherein the polarizing film is formed with a plurality of openings within the surface thereof; and
wherein the plurality of second light extracting dots cover the plurality of openings of the polarizing film, respectively.

13. An optical element comprising:

a panel member having a first surface and a second surface opposite to the first surface; and a plurality of light extracting dots applied to the first surface, each light extracting dot having a curved surface intersecting the first surface and a transition between the curved surface and the first surface, the transition including substantially continuous angular configuration from the curved surface angular orientation to the first surface angular orientation, wherein each of light extracting dots is configured to direct light rays impinging on the light extracting dot inwardly of the panel member from the first surface, further comprising:

a plurality of second light extracting dots applied to the second surface, each having a second curved surface intersecting the second surface and a transition between the second curved surface and the second surface, the transition of each of the plurality of second light extracting dots including substantially continuous angular configuration from the second curved surface angular orientation to the second surface angular orientation, each of said second light extracting dots being configured to direct light rays impinging on the second light extracting dot out of the panel member in a desired direction.

* * * * *